March 19, 1968 J. F. PETERSEN 3,373,959

CONTROL APPARATUS

Filed Oct. 21, 1965 2 Sheets-Sheet 1

INVENTOR.
JOHN F. PETERSEN

BY

ATTORNEY

March 19, 1968 J. F. PETERSEN 3,373,959

CONTROL APPARATUS

Filed Oct. 21, 1965 2 Sheets-Sheet 2

INVENTOR.
JOHN F. PETERSEN
BY Roy W. Jensen
ATTORNEY 3,373,959
CONTROL APPARATUS John F. Petersen, New Brighton, Minn., assignor to Honeywell Inc., Minneapolis, Minn., a corporation of Delaware Filed Oct. 21, 1965, Ser. No. 499,386
6 Claims. (Cl. 244—77)

This invention relates to computing apparatus, particularly electronic analog computing apparatus which provides the functions of multiplication and division.

It is an object of the invention to provide computing apparatus comprising an operational amplifier wherein a signal modulates the amplifier input and feedback currents, and the amplifier output voltage corresponds to the amplifier input voltage multiplied or divided by a factor which is dependent upon the modulating signal.

The nature and distinguishing features and advantages of the invention can be clearly understood from the following description and the accompanying drawings in which.

Figure 1:
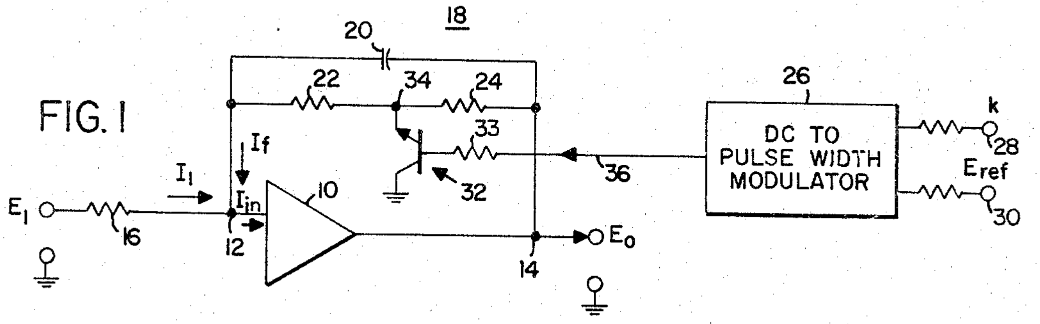
FIGURE 1 is a schematic diagram of a divider circuit.

The apparatus of FIGURE 1 includes a high gain D-C amplifier 10 with input terminal 12 and output terminal 14. A first signal voltage $E_1$, in series with a resistor 16, ($R_{16}$), is connected to input terminal 12. Under normal operating conditions, the input current $I_1$, approximately equals $E_1/R_{16}$.

A network 18, comprising a capacitor 20 in parallel with a pair of series resistors 22, 24 is connected between the amplifier input and output terminals. A single tapped resistor may be substituted for resistors 22, 24.

A pulse width modulator 26 with input terminals 28, 30, and an output line 36 provides a train of periodic pulses to the base of an NPN chopper transistor. A series current limiting resistor 33 connects the base of transistor 32 to line 36. The collector of transistor 32 is connected directly to signal ground and the emitter is connected directly to a junction 34 between resistors 22, 24. A positive potential, with respect to signal ground, at the base of transistor 32 effectively places junction 34 at signal ground.

The signal voltage at input terminal 28 of modulator 26, designated $k$, is normalized to have a magnitude within the range of 0–1, i.e., the minimum voltage is zero and the maximum voltage is +1. The voltage at terminal 30, designated $E_{ref}$, may be a periodic sawtooth. The output of modulator 26, present on line 36, is a train of periodic pulses having a fixed period T, and a width depending upon the voltage $k$. With a voltage $k$ equal to zero, the pulse width equals T, i.e., there is effectively a constant positive D-C modulator output. As $k$ increases linearly, the width of the positive modulator pulses decrease linearly. For example, with the voltage $k$ equal to one-half volt, the pulse width or duration equals $T/2$. As $k$ approaches 1, the pulse width approaches zero, i.e., there is no modulator output. The pulse time width, $t$, is given by the following equation:

$$t=T(1-k) \tag{1}$$

The theory of operation of the apparatus of FIGURE 1 can perhaps best be understood from the equations governing the operation of the apparatus. The equations will be expressed in terms of voltage and current transforms and impedance or admittance functions. The average feedback current flowing into junction 12, through network 18, is approximately $$I_f(S)=kE_0(S)\cdot\frac{1}{R_f} \tag{2}$$

where $E_0(S)$ is the output voltage transform at terminal 14 of the amplifier and $R_f$ is the total resistance of series resistors 22, 24. For example, if $k=1$, the pulse width, $t$, of the modulator output is zero (i.e., there is no modulator output), transistor 32 is off, and feedback current flows through the resistors of network 18 and between input and output terminals of amplifier 10. The feedback current then is:

$$I_f(S)=\frac{E_0(S)}{R_f} \tag{3}$$

For an input voltage $k$ less than 1, the average current through resistor 22 decreases because the switch formed by transistor 32 is closed (conducts) $100(1-k)\%$ of the time. When transistor 32 conducts, junction 34 is effectively placed at signal ground and feedback current flow between amplifier input terminal 12 and output terminal 14, through resistor 22 is interrupted or diverted. The purpose of capacitor 20 is to maintain an average current through resistors 22, 24 while junction 34 is periodically being switched to signal ground.

Assume that junction point 12 is at zero potential, then $$I_f(S)=\frac{kE_0(S)}{R_f}+E_0(S)SC_{20} \tag{4}$$

and $$I_1(S)=\frac{E_1(S)}{R_{16}} \tag{5}$$

The transimpedance gain $(-E_0/I_{in})$ of amplifier 10 is very high, therefore, the current into amplifier 10, $I_{in}$, approaches zero and $$I_1(S)+I_f(S)=0 \tag{6}$$

By substitution of (4) and (5) into (6), $$\frac{E_1(S)}{R_{16}}=\frac{-E_0(S)k}{R_f}\cdot\frac{(1+SR_fC_{20}/k)}{1} \tag{7}$$

or $$E_0(S)=\frac{-E_1(S)R_f}{kR_{16}}\cdot\frac{1}{(1+sR_fC_{20}/k)} \tag{8}$$

The steady state, or D-C, output is $$E_0=\frac{-R_f}{R_{16}}\frac{E_1}{k} \tag{9}$$

and it is noted that $E_0$ is directly proportional to the quotient of $E_1$ and $k$. The bandpass of the system can be determined from the time constant $R_fC_{20}/k$. In practice, this time constant is made large with respect to the period T of the modulator and small with respect to the period corresponding to the highest significant frequency component of the signals $E_1$ and $k$.

Figure 2:
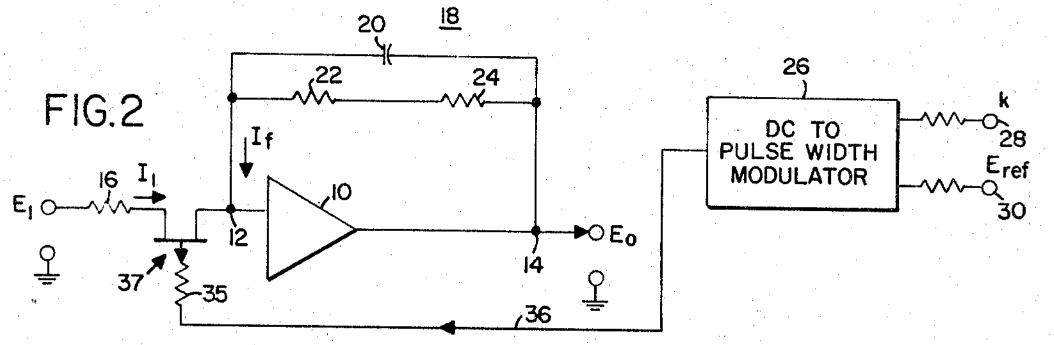
FIGURE 2 is a schematic diagram of a multiplier circuit.

FIGURE 2 is similar to FIGURE 1 except for two changes. Transistor 32 of FIGURE 1 is deleted in FIGURE 2 and transistor 37 is added. Transistor 37 is P-Channel unipolar, or Field Effect Transistor (FET). (Note: When applicable, the same reference numerals are used in all figures.) It is connected in series with resistor 16 and junction 12. Resistor 16 is connected to the source contact, junction 12 is connected to the drain contact, and the gate contact is connected to input line 36 of modulator 26 through a series current limiting resistor 35. Positive potential pulses on line 36, produced by modulator 20, cause FET 37 to be on $100(1-k)\%$ of the time. The following equations relate to FIGURE 2:

$$I_f(S)=\frac{E_0(S)}{R_f}(1+SC_{20}R_f) \quad (10)$$

and $$I_1(S)=\frac{E_1(S)(1-k)}{R_{16}} \quad (11)$$

At junction 12, $$I_f(S)+I_1(S)=0 \quad (12)$$

and, by substitution, $$E_0(S)=-(1-k)E_1(S)\frac{R_f}{R_{16}}\frac{1}{(1+SR_fC_{20})} \quad (13)$$

The steady state, or D-C, value, $E_0$, is directly proportional to the product of $E_1$ and the factor $(1-k)$, i.e., $$E_0=-(1-k)E_1\frac{(R_f)}{R_{16}}$$

Figure 3:
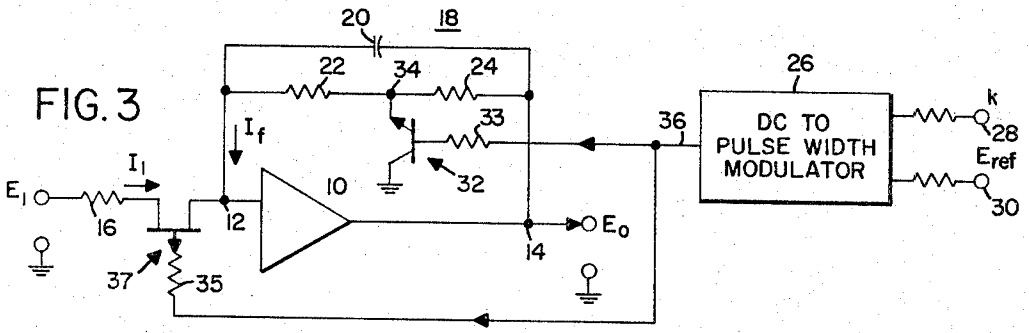
FIGURE 3 is a schematic diagram of a multiplier-divider circuit.

FIGURE 3 represents a composite embodiment of the apparatus of FIGURES 1 and 2. FIGURE 3 is identical to FIGURE 1 except that the FET 37 of FIGURE 2 is added. The equations relating to FIGURE 3 are:

$$I_f(S)=\frac{kE_0(S)}{R_f}(1+SC_{20}R_f/k) \quad (14)$$

and $$I_1(S)=\frac{E_1(S)}{R_{16}}(1-k) \quad (15)$$

At junction 12, $$I_1(S)+I_f(S)=0 \quad (16)$$

and by substitution $$E_0(S)=\frac{-(1-k)}{k}E_1(S)\frac{R_f}{R_{16}}\frac{1}{(1+SR_fC_{20}/k)} \quad (17)$$

The steady state, or D-C, value, $E_0$, is proportional to the product of $E_1$ and the quotient of the factors $k$ and $(1-k)$, i.e., $$E_0=\frac{-(1-k)}{k}E_1\frac{(R_f)}{R_{16}}$$

Figure 4:
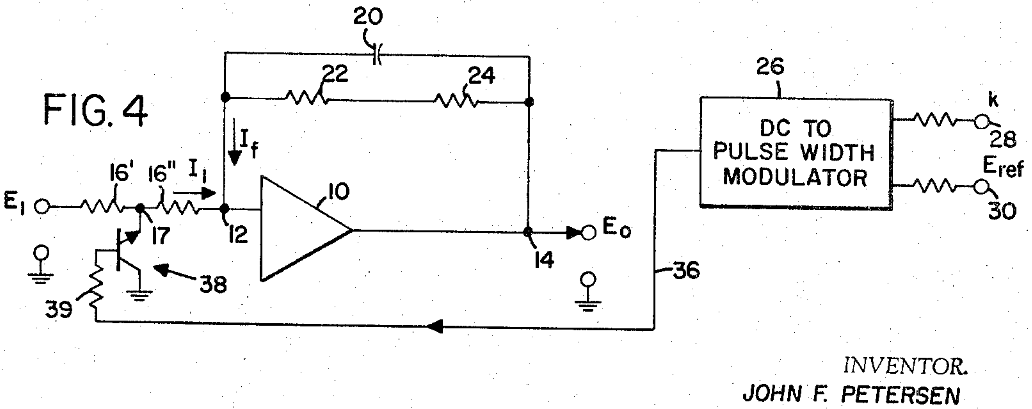
FIGURE 4 is a schematic diagram of a multiplier circuit.

FIGURE 4 is identical to FIGURE 1 except that transistor 32 is deleted, NPN transistor 38 is added, and resistor 16 of FIGURES 1, 2, and 3 is replaced with a pair of resistors 16' and 16'' in series. For purposes of illustration, $R_{16''}=R_{16'}=R_{16}/2$. The emitter of transistor 38 is tied to a junction 17, between resistors 16', 16'', the collector is returned to signal ground, and the base is connected to output line 36 of modulator 26 through a series current limiting resistor 39. Positive potential pulses on line 36, produced by modulator 26, turn transistor 38 on, thereby effectively grounding junction 17 and interrupting the flow of $I_1$ into input terminal 12 of amplifier 10. The equations relating to FIGURE 4 are:

$$I_f(S)=\frac{E_0(S)}{R_f}(1+SC_{20}R_f) \quad (18)$$

and $$I_1(S)=E_1(S)\frac{k}{R_1} \quad (19)$$

At junction 12, $$I_f(S)+I_1(S)=0 \quad (20)$$

and by substitution $$E_0(S)=\frac{-R_f}{(1+SC_{20}R_f)}\cdot\frac{kE_1(S)}{R_1} \quad (21)$$

The steady state, or D-C, value, $E_0$, is proportional to the product of $k$ and $E_1$.

Figure 5:
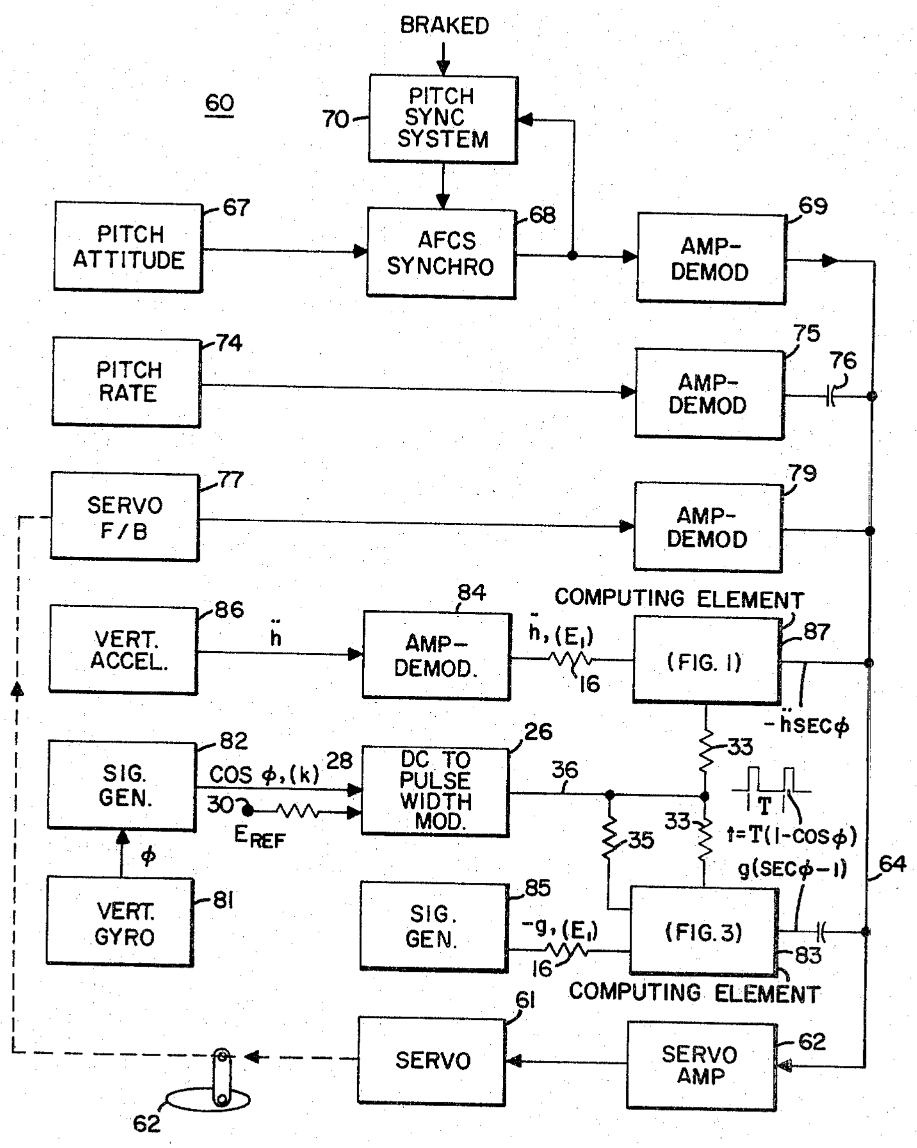
FIGURE 5 is a block diagram of an aircraft control system employing the computing circuits of FIGURE 1 and FIGURE 3.

Application or use of the computing device is illustrated, for example, in FIGURE 5. In FIGURE 5, there is a control apparatus for controlling a vehicle, such as an aircraft, about its lateral axis. The control apparatus 60, by means of a servo motor 61, positions an elevator surface 62 of an aircraft to cause a change in the angle of attack thereof. The servo motor 61 is reversibly driven by a servo amplifier 63 which has control signals supplied thereto over a signal summing conductor 64. In the present example, the conductor 64 supplied D-C control signals to the servo amplifier 63.

The source of control signals will now be considered. A pitch attitude signal is derived by a pitch attitude sensor 67 which drives a synchro 68, providing an A-C signal which is supplied to an amp-demod (amplifier-demodulator) 69 which converts the A-C signal to a D-C signal. Associated with the synchro 68 is a conventional pitch synchronizing system 70 which serves to null the synchro during certain operations through a motor operated means, unimportant here. When the motor is in the "braked" condition, as in FIGURE 5, the pitch attitude signal to synchro 68 is not nulled by the motor of means 70 and an electrical signal corresponding to pitch attitude is present at conductor 64.

A pitch rate sensor 74 supplies an A-C signal to an amp-demod 75 which has its output transmitted through a high-pass condenser 76 to conductor 64.

Servo 61, which actuates elevator surface 62, also operates a servo feedback signal generator 77 which supplies an A-C signal in accordance with the servo displacement from a null position. The signal from the servo feedback signal generator 77 is amplified and demodulated by amp-demod 79 and feed to the summing conductor 64.

More pertinent to the invention, the following portion of the control signal source for control apparatus 60 pertains to an application of the novel computing arrangement as shown in FIGURES 1 and 3.

In this portion of control apparatus 60, a vertical gyro 81 develops a signal which is a function of the aircraft bank angle $\phi$. The output of gyro 81 actuates, or serves as an input to, a signal generator 82 which provides an electrical output signal which is a function of $\phi$, in this case $\cos\phi$. The signal $\cos\phi$ corresponds to the signal designated $k$ in FIGURES 1–4. The signal $\cos\phi$ is fed to input 28 of modulator 26. The output of modulator 26, present on line 36, is fed to three points, resistors 33, 35 of the computing apparatus of FIGURE 3, designated by the numeral 83, and to resistor 33 of the computing element of FIGURE 1, designated by the numeral 87.

A vertical accelerometer 86 develops an A-C signal, designated $\ddot{h}$, which is a function of vertical acceleration. The A-C signal $\ddot{h}$ is amplified and demodulated in amp-demod 84. The output of amp-demod 84, a D-C signal which is a function of $\ddot{h}$, is fed to resistor 16 of computing element 87. The signal $\ddot{h}$ in FIGURE 5 corresponds to the signal $E_1$ of FIGURES 1–4. The output signal, $E_0$, of computing element 87 varies as the function $-\ddot{h}\sec\phi$ and is fed directly to summing conductor 64.

A signal generator 85 develops a D-C signal, which represents, or corresponds to, $a$—$1g$ acceleration. This signal is fed to resistor 16 of computing element 83. It can be shown that the output of computing element 83 varies as the function $+g(\sec\phi-1)$. The output of computing element 83 is high-passed (i.e., fed through a capacitor) to summing conductor 64.

When an aircraft is placed in a banked turn, the vertical component of the lift vector tends to decrease, and if no compensation were made, the craft would lose altitude in a banked turn. (The vertical component of lift along the yaw axis of the aircraft varies as $\sec\phi-1$.) To counteract such loss in altitude, the angle of attack of the aircraft is increased, increasing the lift along the Z axis, thereby maintaining the vertical lift vector constant despite the banked attitude. The signal that varies as $-\ddot{h}\sec\phi$, the primary error signal, commands a change in angle of attack, providing a signal to servo amplifier 63 which drives servo 61 which actuates elevator surface 62 to deflect and produce an increase in angle of attack.

The signal that varies as $g(\sec\phi - 1)$ provides an additional signal which enhances the primary error signal $\ddot{h}$ sec $\phi$. This signal is summed with the signal that varies as $-h$ sec $\phi$. With the aircraft banked, if the commanded change in angle of attack from the output of computing apparatus is ideal, i.e., maintains the same vertical lift as before the bank, there will be no change in vertical acceleration for the given flight condition. If the commanded change in angle of attack does not provide sufficient increase in lift the vertical accelerometer senses an altitude rate (acceleration) and provides additional correction signal. The output of servo 61 also drives a servo feedback element 77, which provides a feedback signal to the summing conductor 64, rebalancing, or nulling, the system.

While a specific application of the computing arrangements have been shown as applied to a flight control apparatus, the computing apparatus is not limited to such application or use.

It is to be understood that the above-described arrangements are illustrative of the application of the principles of the invention. Other arrangements may be devised by those skilled in the art without departing from the spirit and scope of the invention.

What is claimed is:

1. Computing means comprising in combination:

a D-C amplifier, having input and output terminals;

means connected to the amplifier input terminal, causing a current directly proportional to a first signal to flow thereinto;

a network connected between the amplifier output and input terminals, comprising a capacitor and tapped resistor, in parallel;

a pulse width modulator, providing a train of periodic pulses, the width of the pulses linearly decreasing and increasing as a second signal increases and decreases respectively; and, switching means connected to the resistor tap, responsive to the pulses and interrupting resistive current flow, in said network, between amplifier input and output terminals in coincidence with the pulses.

2. Computing apparatus comprising in combination:

a D-C amplifier, having input and output terminals;

means for providing a current directly proportional to a first signal, flowing into the amplifier input terminal;

a parallel R-C network, connected between the amplifier input and output terminals;

a pulse width modulator, providing a train of periodic pulses, the width of the pulses linearly decreasing and increasing as a second signal increases and decreases respectively; and, switching means, responsive to the pulses, interrupting the current proportional to the first signal flowing into the amplifier input terminal in coincidence with the pulses.

3. Computing apparatus comprising in combination:

a D-C amplifier, having input and output terminals;

means for producing a current directly proportional to a first signal, flowing into the amplifier input terminal;

a network connected between the amplifier input and output terminals, comprising a capacitor and tapped resistor, in parallel;

a pulse width modulator, providing a train of periodic pulses, the pulse width linearly decreasing and increasing as a second signal increases and decreases respectively;

first switching means, connected to the resistor tap, responsive to the pulses, and interrupting resistive current flow, in said network, between the amplifier input and output terminals, in coincidence with the pulses; and, second switching means, responsive to the pulses, interrupting the current proportional to the first signal flowing into the amplifier input terminals, in coincidence with the pulses.

4. The apparatus of claim 3, wherein the first signal is in accordance with the flight conditions of an aircraft, the second signal is in accordance with cos $\phi$, where $\phi$ is the bank angle of the craft; and, means connected to the output terminal of the amplifier for controlling attitude of the aircraft.

5. The apparatus of claim 1, wherein the first signal is in accordance with the vertical acceleration of an aircraft, the second signal is in accordance with cos $\phi$ where $\phi$ is the aircraft angle of bank; and, means connected to the output terminal of the amplifier for controlling pitch attitude of the aircraft.

6. In aircraft attitude control apparatus, a computing means comprising in combination:

a D-C amplifier, having input and output terminals;

means connected to the amplifier input terminal causing a current which is a function of the vertical acceleration of the aircraft flow thereinto;

a network connected between the amplifier output and input terminals, comprising a capacitor and tapped resistor, in parallel;

a pulse width modulator, providing a train of periodic pulses, the width of the pulses linearly decreasing and increasing as cosine $\phi$, where $\phi$ is the angle of bank of the aircraft, increases and decreases respectively;

switching means connected to the resistor tap, responsive to the pulses and interrupting resistive current flow, in said network, between amplifier input and output terminals, in coincidence with the pulses;

second switching means, responsive to the pulses and interrupting the current that is a function of the vertical acceleration of the aircraft, in coincidence with the pulses; and, servo means connected to the output of the amplifier, operating the aircraft elevator surface to prevent loss of altitude of the craft in a banked turn.

References Cited

UNITED STATES PATENTS 3,215,824 11/1965 Alexander et al. ----- 235—193

FERGUS S. MIDDLETON, *Primary Examiner.*